United States Patent
Lee et al.

(10) Patent No.: US 10,084,176 B2
(45) Date of Patent: Sep. 25, 2018

(54) RECHARGEABLE BATTERY

(71) Applicant: SAMSUNG SDI CO., LTD., Yongin-si, Gyeonggi-do (KR)

(72) Inventors: Chi-Young Lee, Yongin-si (KR); Myung-Jae Jang, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 194 days.

(21) Appl. No.: 14/864,932

(22) Filed: Sep. 25, 2015

(65) Prior Publication Data

US 2016/0268582 A1    Sep. 15, 2016

(30) Foreign Application Priority Data

Mar. 12, 2015 (KR) .................. 10-2015-0034478

(51) Int. Cl.
*H01M 2/06* (2006.01)
*H01M 2/30* (2006.01)
*H01M 2/08* (2006.01)

(52) U.S. Cl.
CPC .............. *H01M 2/30* (2013.01); *H01M 2/06* (2013.01); *H01M 2/08* (2013.01)

(58) Field of Classification Search
CPC ...................................................... H01M 2/06
See application file for complete search history.

(56) References Cited

U.S. PATENT DOCUMENTS

| 2008/0160393 | A1* | 7/2008 | Kim | ............... | H01M 2/08 |
| | | | | | 429/94 |
| 2009/0087738 | A1* | 4/2009 | Kim | ............... | H01M 2/0404 |
| | | | | | 429/185 |
| 2009/0186269 | A1 | 7/2009 | Kim et al. | | |
| 2013/0004832 | A1* | 1/2013 | Kim | ............... | H01M 2/08 |
| | | | | | 429/179 |

FOREIGN PATENT DOCUMENTS

KR   10-2009-0081197 A   7/2009
KR   10-2012-0016470 A   2/2012

* cited by examiner

*Primary Examiner* — Jonathan G Leong
(74) *Attorney, Agent, or Firm* — Lee & Morse, P.C.

(57) ABSTRACT

A rechargeable battery, including an electrode assembly for performing charging and discharging operations; a case in which the electrode assembly is placed; a cap plate for closing and sealing an opening of the case; an electrode terminal provided outside of the cap plate through a terminal hole of the cap plate, the electrode terminal electrically coupled to the electrode assembly; and an insulating member for electrically insulating the electrode terminal from the cap plate, the electrode terminal including a rivet terminal in the terminal hole and a plate terminal connected to the rivet terminal outside of the cap plate, and the insulating member including a first insulator at an external circumference of the rivet terminal outside of the terminal hole and a second insulator between the cap plate and the plate terminal at an external circumference of the first insulator.

13 Claims, 7 Drawing Sheets

RECHARGEABLE BATTERY

CROSS-REFERENCE TO RELATED APPLICATION

Korean Patent Application No. 10-2015-0034478, filed on Mar. 12, 2015, in the Korean Intellectual Property Office, and entitled: "Rechargeable Battery," is incorporated by reference herein in its entirety.

BACKGROUND

1. Field

Embodiments relate to a rechargeable battery.

2. Description of the Related Art

A rechargeable battery may differ from a primary battery in that it may be repeatedly charged and discharged, while the latter is incapable of being recharged. A low-capacity rechargeable battery may be used in small portable electronic devices such as mobile phones, notebook computers, and camcorders, and a high-capacity rechargeable battery may be used as a power source that may drive a motor of a hybrid vehicle.

SUMMARY

Embodiments may be realized by providing a rechargeable battery, including an electrode assembly for performing charging and discharging operations; a case in which the electrode assembly is placed; a cap plate for closing and sealing an opening of the case; an electrode terminal provided outside of the cap plate through a terminal hole of the cap plate, the electrode terminal electrically coupled to the electrode assembly; and an insulating member for electrically insulating the electrode terminal from the cap plate, the electrode terminal including a rivet terminal in the terminal hole and a plate terminal connected to the rivet terminal outside of the cap plate, and the insulating member including a first insulator at an external circumference of the rivet terminal outside of the terminal hole and a second insulator between the cap plate and the plate terminal at an external circumference of the first insulator.

The rechargeable battery may further include a gasket between the rivet terminal and the terminal hole. The gasket may extend between a flange extending from the rivet terminal and an inner surface of the cap plate.

The cap plate may include a first protrusion that protrudes from an external surface of the cap plate in accordance with the opening, and the first protrusion may be inserted into the opening to weld an inner lateral surface of the opening and an outer lateral surface of the first protrusion together.

The cap plate further may include a second protrusion protruding from the external surface, the second protrusion enclosing an outer edge of the terminal hole, and the second protrusion supporting a circumferential surface of the first insulator.

The plate terminal may include a through-hole penetrated by the rivet terminal; and an expansion groove connected to the through-hole, the expansion groove contacting the first insulator, the expansion groove having a larger diameter than the through-hole.

The first insulator may be supported at a first side by the external surface of the cap plate and the second protrusion, and the first insulator may be supported at a second side opposite the first side by an inner surface of the plate terminal and the expansion groove.

The second insulator may include a plate between the plate terminal and the second protrusion facing each other, the plate including a hole penetrated by the first insulator; and a protrusion protruding from the plate to partially enclose an external circumferential surface of the plate terminal.

The plate may include a cutting line that that radially extends towards the hole.

The second insulator may include first and second half insulators that are inserted between the plate terminal and the second protrusion facing each other in a planar direction of the cap plate to be combined with each other.

Each of the first and second half insulators may include a half plate including a half groove partially corresponding to the external circumference of the first insulator; and protrusions protruding from the half plate to partially enclose an external circumferential surface of the plate terminal, and the protrusion of the first half insulator may include a coupling groove, and the protrusion of the second half insulator may include a coupling protrusion combined with the coupling groove.

The first half insulator and the second half insulator may include a synthetic resin material.

The first insulator may be smaller than the plate terminal, and the second insulator may be larger than the plate terminal.

The first insulator may include a synthetic resin material, and the second insulator may include a rubber material.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
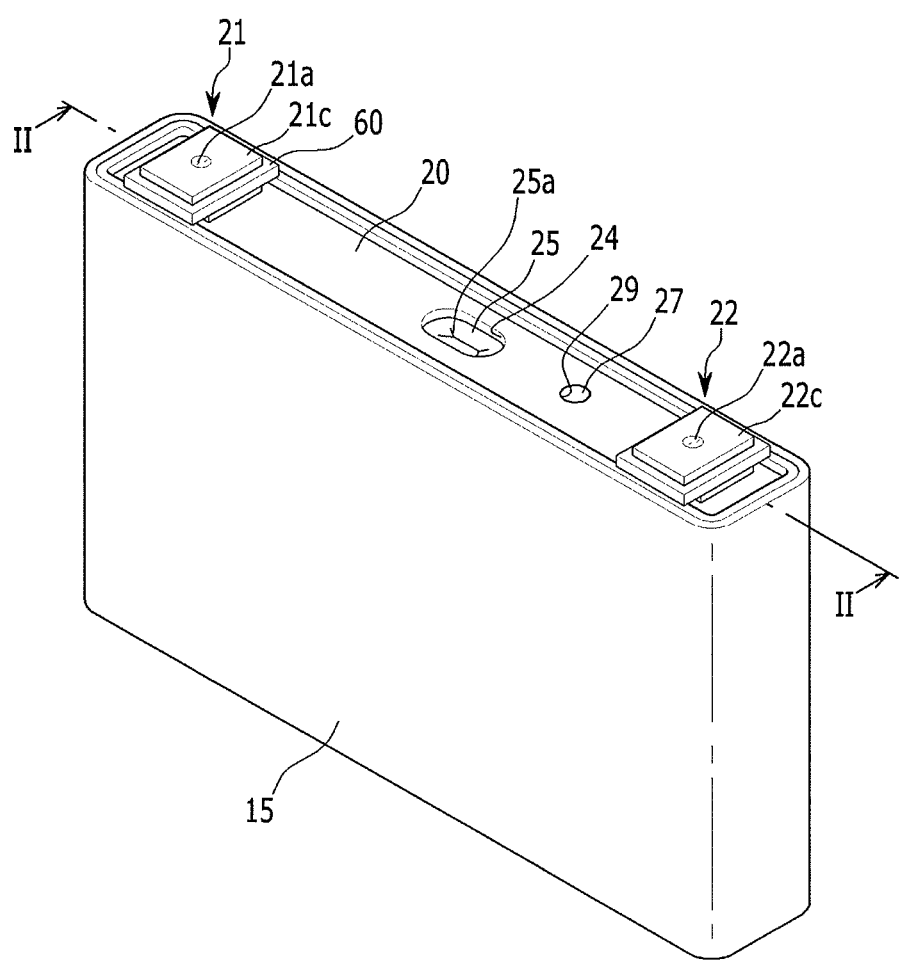
FIG. 1 illustrates a perspective view of a rechargeable battery according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of features may be exaggerated for clarity of illustration. Like reference numerals refer to like elements throughout.

Figure 2:
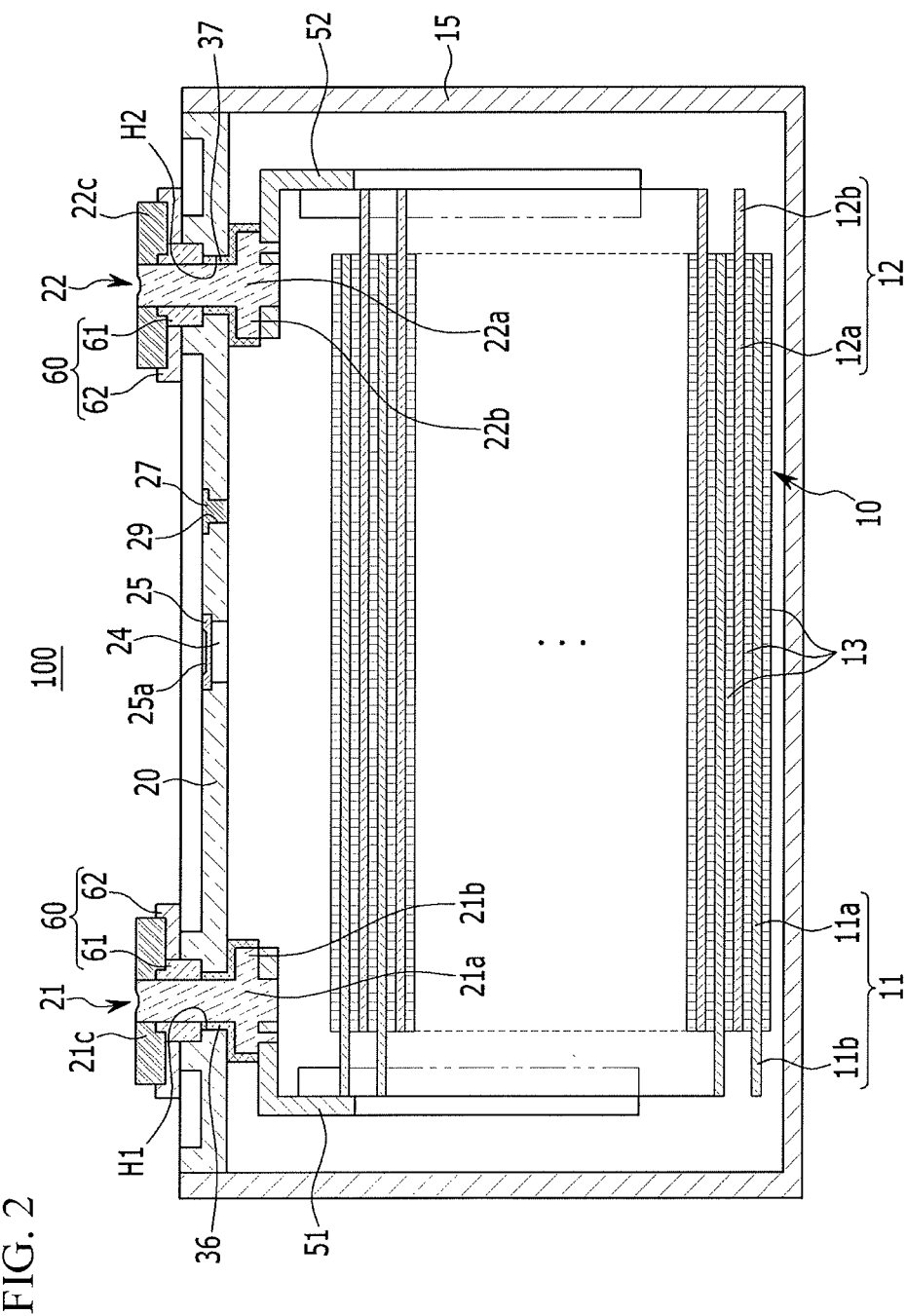
FIG. 2 illustrates a cross-sectional view of FIG. 1 taken along the line II-II.

FIG. 1 illustrates a perspective view of a rechargeable battery according to a first exemplary embodiment, and FIG. 2 illustrates a cross-sectional view of FIG. 1 taken along the line II-II. Referring to FIGS. 1 and 2, the rechargeable battery 100 of the first exemplary embodiment may include: an electrode assembly 10 in which a current may be charged and discharged; a case 15 in which the electrode assembly 10 may be placed; a cap plate 20 that may seal an opening of the case 15; electrode terminals provided to penetrate the cap plate 20 (e.g., negative and positive electrode terminals 21 and 22); and an insulating member 60 that may electrically insulate the negative and positive electrode terminals 21 and 22 from the cap plate 20.

For example, the electrode assembly 10 may be formed by disposing negative and positive electrodes 11 and 12 at opposite surfaces of a separator 13, which may act as an insulator, and spirally winding the negative electrode 11, the separator 13, and the positive electrode 12 in a jelly-roll state. The positive and negative electrodes 11 and 12 respectively may include coated regions 11a and 12a where an active material is coated on current collectors made of a metal plate, and uncoated regions 11b and 12b where an active material is not coated thereon and which may be formed as exposed current collectors.

The uncoated region 11b of the negative electrode 11 may be formed at one end of the negative electrode 11 along the wound negative electrode 11. The uncoated region 12b of the positive electrode 12 may be formed at one end of the positive electrode 12 along the wound positive electrode 12. The uncoated regions 11b and 12b of the negative and positive electrodes 11 and 12 may respectively be disposed at opposite ends of the electrode assembly 10.

For example, the case 15 may substantially be formed as a cuboid in which a space for accommodating the electrode assembly 10 and an electrolyte solution may be set, and the opening may be formed at one side of the cuboid to connect inner and outer spaces of the case 15. The opening may allow the electrode assembly 10 to be inserted into the case 15.

The cap plate 20 may be installed in the opening of the case 15 to seal the case 15. For example, the case 15 and the cap plate 20 may be formed of, e.g., include, aluminum, and may be welded to each other.

An electrolyte injection opening 29, a vent hole 24, and terminal holes H1 and H2 may be provided in the cap plate 20. After the cap plate 20 is combined, e.g., attached, to the case 15, the electrolyte injection opening 29 may allow the electrolyte solution to be injected into the case 15. After being injected with the electrolyte solution, the electrolyte injection opening 29 may be sealed by a sealing cap 27.

The vent hole 24 may be sealed by a vent plate 25 that may discharge internal pressure of the rechargeable battery 100. The vent plate 25 may be ruptured to open the vent hole 24 when the internal pressure of the rechargeable battery 100 reaches a predetermined pressure. The vent plate 25 may be provided with a notch 25a that may induce the rupture.

The negative and positive electrode terminals 21 and 22 may be provided in the terminal holes H1 and H2 of the cap plate 20 to be electrically coupled to the electrode assembly 10. The negative electrode terminal 21 may be electrically coupled to the negative electrode 11 of the electrode assembly 10, and the positive electrode terminal 22 may be electrically coupled to the positive electrode 12 of the electrode assembly 10. The electrode assembly 10 may be drawn out of the case 15 through the negative and positive electrode terminals 21 and 22.

The negative and positive electrode terminals 21 and 22 may include rivet terminals 21a and 22a that may respectively be provided in the terminal holes H1 and H2 of the cap plate 20, and plate terminals 21c and 22c that may be disposed outside of the cap plate 20 to be coupled to the rivet terminals 21a and 22a by riveting or welding. The negative and positive electrode terminals 21 and 22 may further include flanges 21b and 22b that may be formed to extend widely and integrally from the rivet terminals 21a and 22a under the cap plate 20.

The insulating member 60 may include a first insulator 61 and a second insulator 62 that may be separately formed to be combined with each other. The first insulator 61 may be disposed between the plate terminal 21c and the cap plate 20, and may be provided at external circumferences of the rivet terminals 21a and 22a outward of the terminal holes H1 and H2. The first insulator 61 may electrically insulate the cap plate 20 from the rivet terminals 21a and 22a, and the plate terminals 21c and 22c from the cap plate 20.

The second insulator 62 may be provided between the cap plate 20 and the plate terminals 21c and 22c at an external circumference of the first insulator 61. The second insulator 62 may electrically insulate the cap plate 20 and the plate terminals 21c and 22c outward of the first insulator 61, e.g., in a direction away from the electrode terminal. The cap plate 20 and the plate terminals 21c and 22c may be electrically insulated by the first and second insulators 61 and 62.

The rechargeable battery 100 may further include gaskets 36 and 37 that may be interposed between the rivet terminals 21a and 22a and the terminal holes H1 and H2. The gaskets 36 and 37 may respectively be provided between the rivet terminals 21a and 22a and inner surfaces of the terminal holes H1 and H2 of the cap plate 20 to seal and electrically insulate the rivet terminals 21a and 22a from the terminal holes H1 and H2.

The gaskets 36 and 37 may extend further between the flanges 21b and 22b and the inner surface of the cap plate 20 to seal and electrically insulate the flanges 21b and 22b from the inner surface of the cap plate 20.

Figure 3:
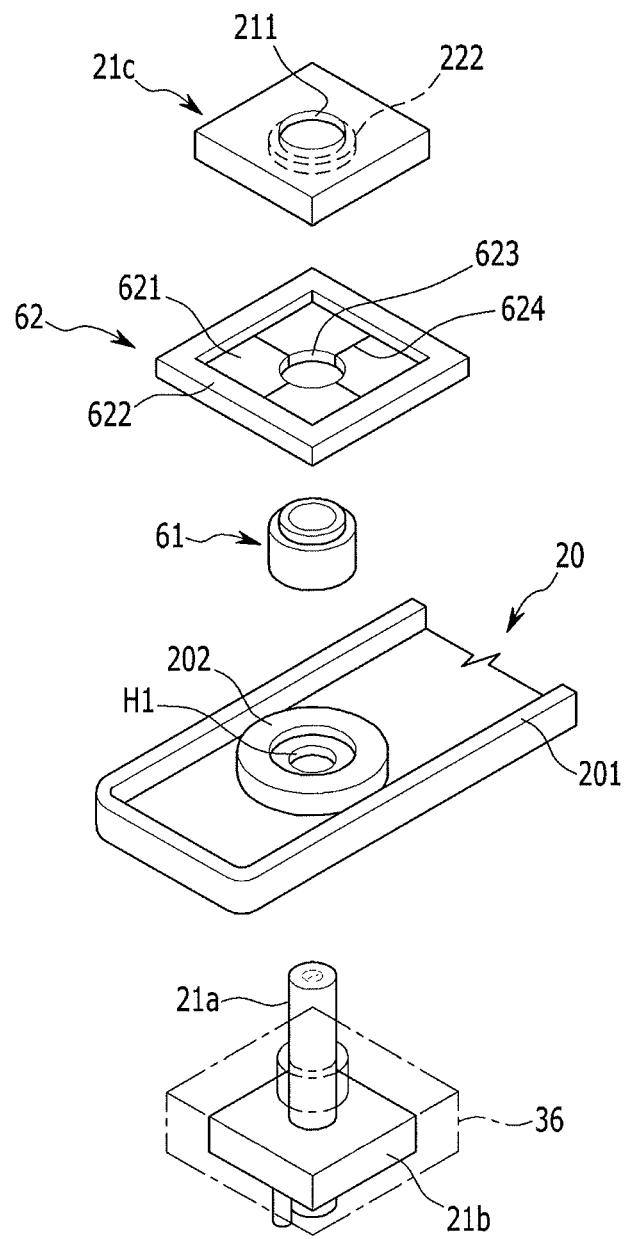
FIG. 3 illustrates an exploded perspective view of an electrode terminal and a cap plate of FIG. 1.
Figure 4:
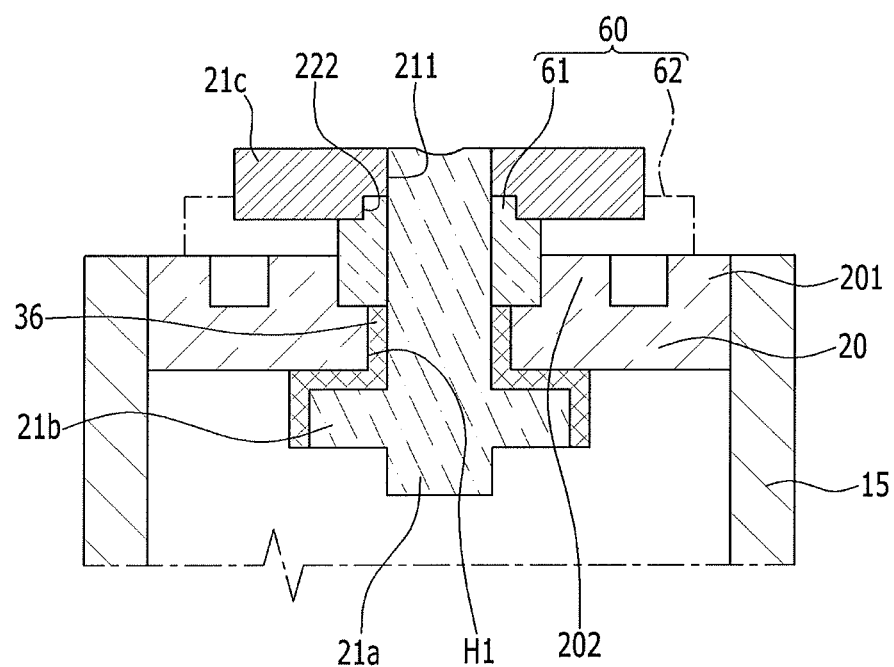
FIG. 4 illustrates a cross-sectional view of the electrode terminal and the cap plate assembled after interposing a first insulator of FIG. 3 therebetween.

Negative and positive electrode lead tabs 51 and 52 respectively may electrically couple the negative and positive electrode terminals 21 and 22 to the uncoated regions 11b and 12b of the negative and positive electrodes 11 and 12 of the electrode assembly 10. By combining the negative and positive electrode lead tabs 51 and 52 to lower ends of the rivet terminals 21a and 22a and caulking the lower ends thereof, the negative and positive electrode lead tabs 51 and 52 may be supported by the flanges 21b and 22b and may be connected to the lower ends of the rivet terminals 21a and 22a. FIG. 3 illustrates an exploded perspective view of an electrode terminal and a cap plate of FIG. 1, and FIG. 4 illustrates a cross-sectional view of the electrode terminal and the cap plate assembled after interposing a first insulator of FIG. 3 therebetween.

Since the insulating member 60 may identically be provided near the negative and positive electrode terminals 21 and 22, the insulating member 60 and the cap plate 20 near the negative terminal 21 will be described, for ease of description. Referring to FIGS. 3 and 4, the cap plate 20 may include a first protrusion 201 that protrudes from an external surface in accordance with, e.g., defining an outer periphery of, the opening of the case 15.

The cap plate 20 may close and seal the opening of the case 15, with the cap plate 20 inserted into the opening of the case 15 and an inner lateral surface of the opening of the case 15 and an outer lateral surface of the first protrusion 201 welded together. The first protrusion 201 may increase a thickness of the cap plate 20 in a welded part, and welding strength between the cap plate 20 and the case 15 may increase.

The cap plate 20 may further include a second protrusion 202 that protrudes from the external surface, encloses an outer edge of the terminal hole H1, and supports an external circumferential surface of the first insulator 61. The second protrusion 202 may support a lateral surface of the first insulator 61 that may be compressed between the cap plate 20 and the plate terminal 21c.

The plate terminal 21c may include a through-hole 211 that may be penetrated by the rivet terminal 21a, and an expansion groove 222 that may be connected to the through-hole 211 near the first insulator 61, e.g., the expansion groove 222 may be connected to the through-hole 211 and may contact the first insulator 61, and that may be formed to have a larger diameter than the through-hole 211. The first insulator 61 may support the expansion groove 222 of the plate terminal 21c and an inner surface of the plate terminal 21c.

The first insulator 61 may be supported at its one side, e.g., a first side, by an external surface of the cap plate 20 and the inner circumferential surface of the second protrusion 202, and may be supported at its opposite side, e.g., a second side opposite the first side, by the inner surface of the plate terminal 21c and the expansion groove 222. Accordingly, the plate terminal 21c and the second protrusion 202 of the cap plate 20 may be separated and electrically insulated from each other.

After the plate terminal 21c and the rivet terminal 21a are connected while interposing the first insulator 61 therebetween, the cap plate 20 may be inserted into the opening of the case 15, and the inner lateral surface of the opening of the case 15 and the first protrusion 201 of the cap plate 20 may then be welded to each other. The first insulator 61 may be formed such that it has a smaller size than the plate terminal 21c.

When the cap plate 20 and the case 15 are welded together, the first insulator 61 may not be affected by welding heat and a laser, and the first insulator 61 may not melt or burn such that the cap plate 20 and the plate terminal 21c may be stably insulated from each other.

FIG. 4 illustrates the rivet terminal 21a and the plate terminal 21c electrically coupled to each other while interposing the first insulator 61 therebetween. By combining the first insulator 61 and the plate terminal 21c to an upper end of the rivet terminal 21a and then caulking the upper end thereof, the first insulator 61 and the plate terminal 21c may be combined, e.g., attached, to the upper end of the rivet terminal 21a.

Figure 5:
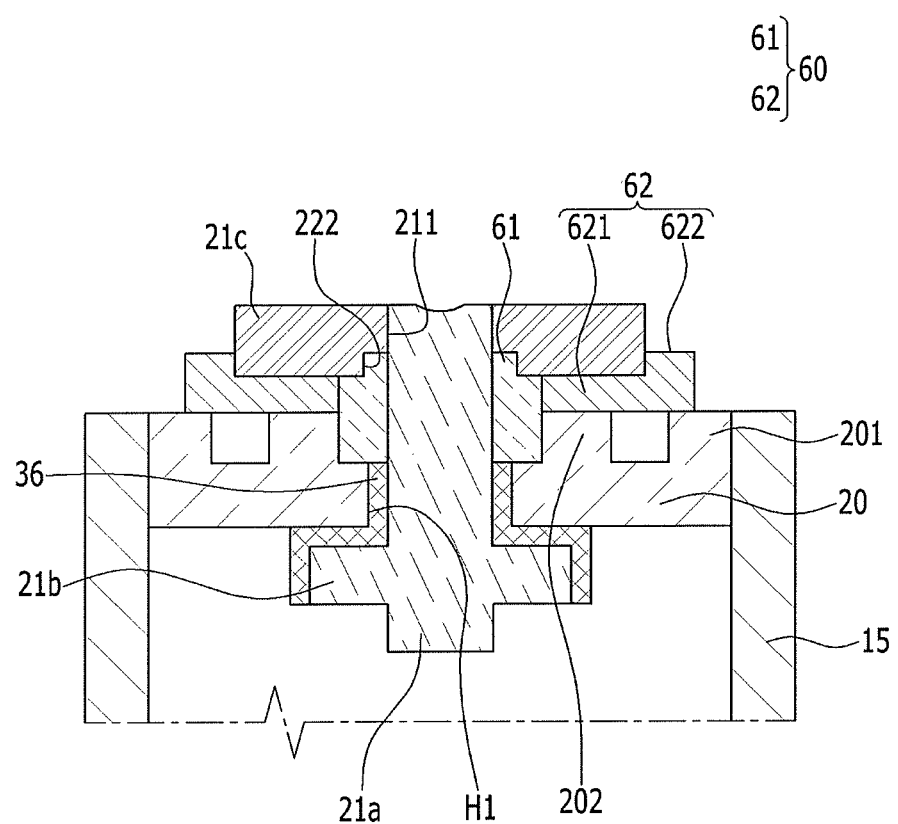
FIG. 5 illustrates a cross-sectional view of the electrode terminal and the first insulator of FIG. 4 including a second insulator.

FIG. 5 illustrates a cross-sectional view of the electrode terminal and the first insulator of FIG. 4 including the second insulator. Referring to FIGS. 3 to 5, the second insulator 62 may be provided between the plate terminal 21c and the cap plate 20 and may include a plate 621 and a protrusion 622, and may be formed such that it has a larger size than the plate terminal 21c.

The plate 621 may be interposed between the inner surface of the plate terminal 21c and the second protrusion 202 such that they are electrically insulated from each other, and may include a hole 623 that may be penetrated by the first insulator 61.

The first insulator 61 may be combined, e.g., attached, to the plate terminal 21c after penetrating through the hole 623 of the plate 621. The protrusion 622 may protrude from the plate 621 at one side thereof, and may partially enclose an external circumferential surface of the plate terminal 21c.

Since the second insulator 62 may be provided after penetrating through the assembled plate terminal 21c, the plate 621 may include cutting lines 624 that radially extend towards the hole 623, e.g., the cutting lines 624 may extends in a diametrical direction of the hole 623. For example, the cutting lines 624 may be disposed to be separated from each other at right angles, based on the hole 623.

Since the plate terminal 21c, which may have a larger size than a diameter of the hole 623, may be inserted into the hole 623 as the cutting lines 624 are separated, the cutting lines 624 may be restored to an attached state, and the plate 62 may serve as an electrical insulator. The second insulator 62 may be easily installed at the external circumference of the first insulator 61 by the cutting lines 624.

The first insulator 61 may be formed of a synthetic resin material, and may serve as an insulator. The second insulator 62 may not only serve as an insulator since it may be formed of a rubber material, but may also be elastically deformed, such that it may be installed at the external circumferential surface of the first insulator 61 through the plate terminal 21c.

The second insulator 62 may not be affected by the welding heat and laser at all since it may be installed after the cap plate 20 and the case 15 are welded together. Accordingly, the second insulator 62 may be configured such that the cap plate 20 and the plate terminal 21c are more stably insulated from each other.

A second exemplary embodiment will now be described. A description of the same components as those of the first exemplary embodiment will be omitted, and different components will be described.

Figure 6:
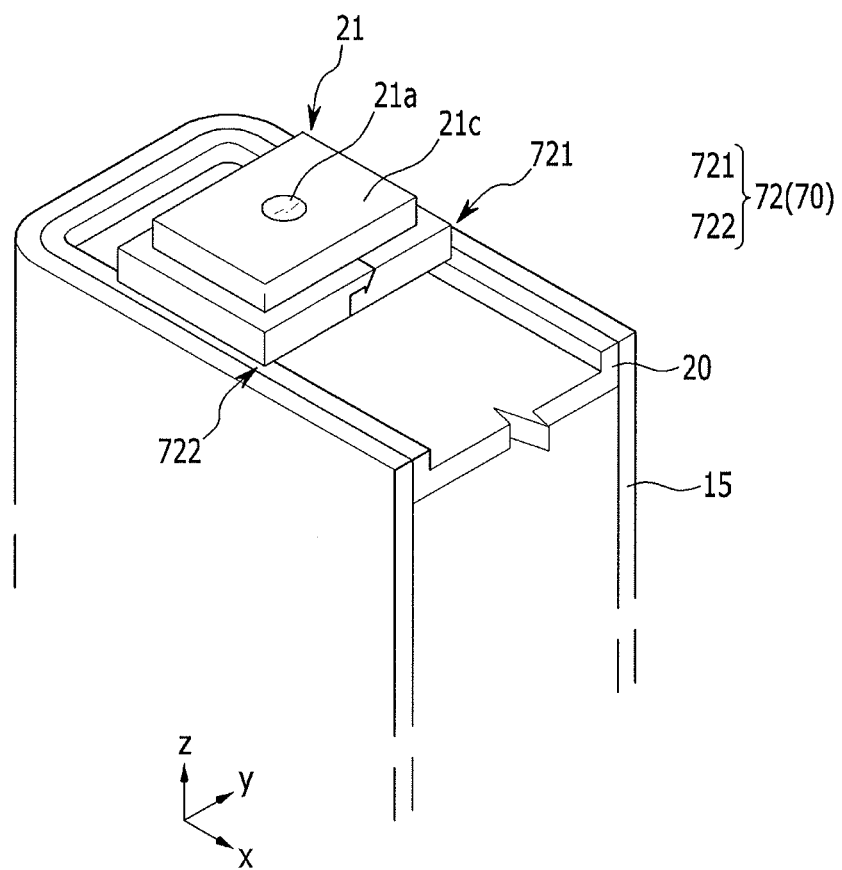
FIG. 6 illustrates a perspective view of a rechargeable battery according to a second exemplary embodiment.
Figure 7:
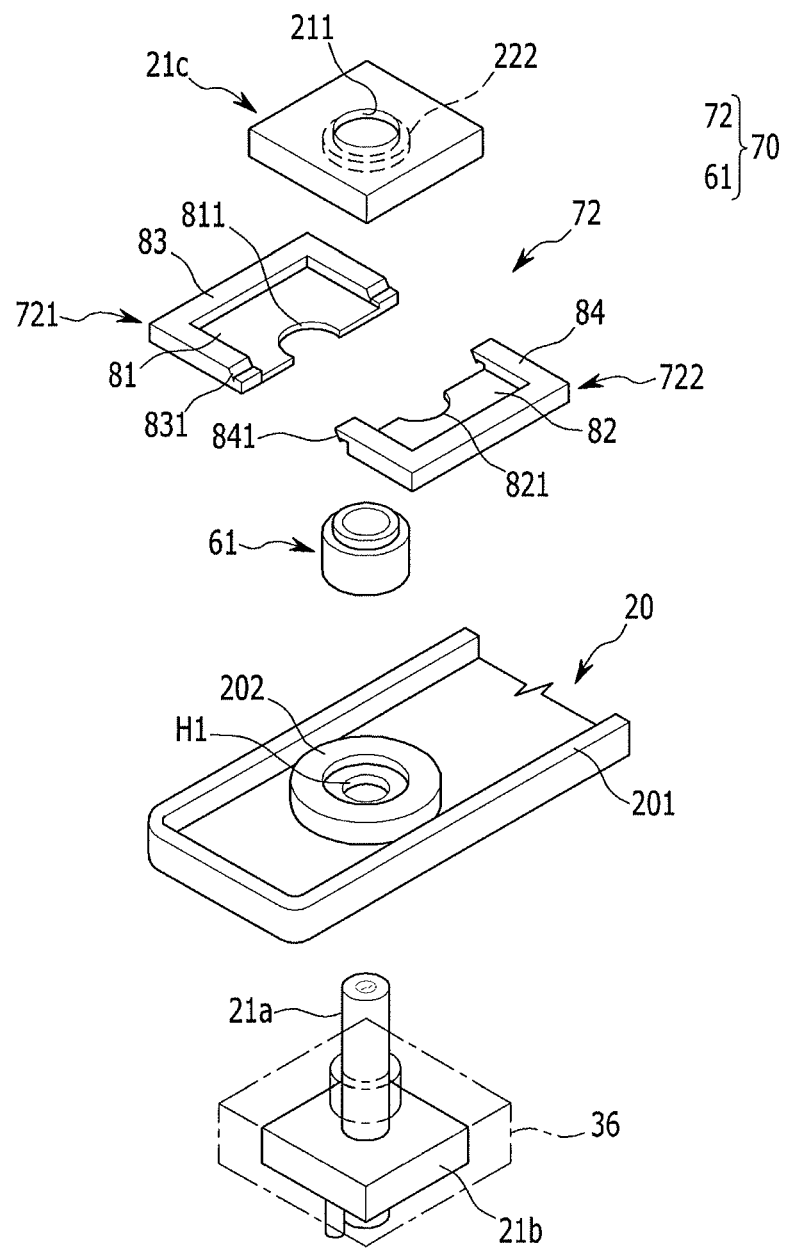
FIG. 7 illustrates an exploded perspective view of an electrode terminal and a cap plate of FIG. 6.

FIG. 6 illustrates a perspective view of a rechargeable battery according to a second exemplary embodiment, and FIG. 7 illustrates an exploded perspective view of an electrode terminal and a cap plate of FIG. 6. Referring to FIGS. 6 and 7, in the rechargeable battery 200 of the second exemplary embodiment, a second insulator 72 of an insulating member 70 may include a first half insulator 721 and a second half insulator 722 that may be combined with each other.

The first and second half insulators 721 and 722 may be inserted in a planar direction of the cap plate 20 (a y-axis direction in an xy-plane) between a plate terminal 21c and a second protrusion 202 facing each other, and may be combined with each other to form the second insulator 72.

The first and second half insulators 721 and 722 may include half plates 81 and 82, and protrusions 83 and 84. The half plates 81 and 82 may include half grooves 811 and 821 that partially correspond to the external circumference of the first insulator 61, such that they may be combined to, e.g., contact, the external circumference of the first insulator 61. The protrusions 83 and 84 may protrude from the half plates 81 and 82 to partially enclose the external circumferential surface of the plate terminal 21c.

The protrusion 83 of the first half insulator 721 may include a coupling groove 831, and the protrusion 84 of the second half insulator 722 may include a coupling protrusion 841 that may be combined to, e.g., attached to or combined with, the coupling groove 831. When the first and second half insulators 721 and 722 are inserted between the plate terminal 21c and the second protrusion 202 facing each other in the y-axis direction, the coupling protrusion 841 formed in the protrusion 84 of the second half insulator 722 may be combined to, e.g., attached to or combined with, the coupling groove 831 formed in the protrusion 83 of the first half insulator 721.

The coupling groove 831 and the coupling protrusion 841 of the first and second half insulators 721 and 722 may make it easier for the second insulator 72 to be installed at the external circumference of the first insulator 61 between the plate terminal 21c and the second protrusion 202 facing each other. The first and second half insulators 721 and 722 may be formed of a synthetic resin material.

The second insulator 72, which may be formed by combining the first half insulator 721 and the second half insulator 722 together, may make assembly work of the second insulator 72 easier than that of the second insulator 62 of the first exemplary embodiment, without being affected by the welding heat and laser.

By way of summation and review, a rechargeable battery may include: an electrode assembly provided with a positive electrode and a negative electrode at opposite surfaces of a separator; a case in which the electrode assembly may be placed; a cap plate that may close and seal an opening of the case; and electrode terminals electrically coupled to the electrode assembly and penetrating the cap plate. The electrode terminals may be electrically insulated from the cap plate while interposing an insulating member therebetween.

A rechargeable battery used as a power source for driving a motor may have a high output, and resistance between a connection part between the electrode terminal and a bus bar and resistances of respective components may be important. Accordingly, a size of the electrode terminal connected to the bus bar may become larger. If the cap plate is welded to the case when a size of the cap plate is similar to that of the electrode terminal, the insulating member surrounding the electrode terminal may melt or burn by welding heat.

Embodiments relate to a rechargeable battery in which a cap plate may be electrically insulated from electrode terminals.

Provided is a rechargeable battery in which an insulating member electrically insulating a cap plate and an electrode terminal may be protected from welding heat when the cap plate and the case are welded.

According to an exemplary embodiment, a first insulator may be assembled to insulate rivet terminals and a cap plate, and the cap plate and plate terminals may further be insulated by a second insulator after welding the cap plate and a case together, and an insulating member insulating the cap plate and an electrode terminal may be prevented from melting and burning.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   an electrode assembly for performing charging and discharging operations;
   a case in which the electrode assembly is placed;
   a cap plate being coupled to an opening of the case and including a terminal hole having a wide hole opening an external surface of the cap plate and a narrow hole opening an internal surface of the cap plate, the wide and narrow holes of the terminal hole connected to each other;
   an electrode terminal electrically coupled to the electrode assembly and including a rivet terminal passing through the wide and narrow holes of the terminal hole of the cap plate and a plate terminal connected to the rivet terminal outside of the cap plate; and
   an insulating member for electrically insulating the electrode terminal from the cap plate,
   the insulating member including a first insulator surrounding an external circumference of the rivet terminal at the wide hole of the terminal hole and a second insulator between the cap plate and the plate terminal at an external circumference of the first insulator, wherein
   the first insulator of the insulating member is partially inserted between the wide hole of the terminal hole and the rivet terminal and is supported by an inner circumferential surface of the wide hole of the terminal hole.

2. The rechargeable battery as claimed in claim 1, further comprising a gasket between the rivet terminal and the narrow hole of the terminal hole, wherein
   the gasket extends between a flange extending from the rivet terminal and an inner surface of the cap plate, and
   the gasket and the first insulator contact each other in the terminal hole.

3. The rechargeable battery as claimed in claim 1, wherein:
   the cap plate includes a first protrusion that protrudes toward the plate terminal, and
   the first protrusion is inserted into the opening of the case to weld an inner lateral surface of the opening and an outer lateral surface of the first protrusion together.

4. The rechargeable battery as claimed in claim 3, wherein the cap plate further includes a second protrusion protruding toward the plate terminal to form the wide hole of the terminal hole, and the second protrusion contacting and supporting a circumferential surface of the first insulator.

5. The rechargeable battery as claimed in claim 4, wherein the plate terminal includes:
   a through-hole penetrated by the rivet terminal; and
   an expansion groove connected to the through-hole, the expansion groove contacting the first insulator, the expansion groove having a larger diameter than the through-hole.

6. The rechargeable battery as claimed in claim 5, wherein:
   the first insulator is supported at a first side by the external surface of the cap plate and the second protrusion, and
   the first insulator is supported at a second side opposite the first side by an inner surface of the plate terminal and the expansion groove.

7. The rechargeable battery as claimed in claim 4, wherein the second insulator includes:
   a plate between the plate terminal and the second protrusion facing each other, the plate including a hole penetrated by the first insulator; and
   a protrusion protruding from the plate to partially enclose an external circumferential surface of the plate terminal.

8. The rechargeable battery as claimed in claim 7, wherein the plate includes a cutting line that that radially extends towards the hole.

9. The rechargeable battery as claimed in claim 4, wherein:
   the plate terminal and the second protrusion face each other, and
   the second insulator includes first and second half insulators that are inserted between the plate terminal and the second protrusion in a planar direction of the cap plate to be combined with each other.

10. The rechargeable battery as claimed in claim 1, wherein:
the first insulator is smaller than the plate terminal, and the second insulator is larger than the plate terminal.

11. The rechargeable battery as claimed in claim 1, wherein:
the first insulator includes a synthetic resin material, and the second insulator includes a rubber material.

12. A rechargeable battery, comprising:
an electrode assembly for performing charging and discharging operations;
a case in which the electrode assembly is placed;
a cap plate for closing and sealing an opening of the case;
an electrode terminal electrically coupled to the electrode assembly and including a rivet terminal passing through a terminal hole of the cap plate and a plate terminal connected to the rivet terminal outside of the cap plate; and
an insulating member for electrically insulating the electrode terminal from the cap plate, the insulating member including a first insulator at an external circumference of the rivet terminal and a second insulator between the cap plate and the plate terminal at an external circumference of the first insulator, the second insulator including first and second half insulators, wherein:
each of the first and second half insulators include:
a half plate including a half groove partially corresponding to an external circumference of the first insulator; and
protrusions protruding from the half plate to partially enclose an external circumferential surface of the plate terminal, and
the protrusion of the first half insulator includes a coupling groove, and the protrusion of the second half insulator includes a coupling protrusion combined with the coupling groove.

13. The rechargeable battery as claimed in claim 12, wherein the first half insulator and the second half insulator include a synthetic resin material.

\* \* \* \* \*